United States Patent [19]

Wyss

[11] Patent Number: 4,764,080
[45] Date of Patent: Aug. 16, 1988

[54] COUPLING FOR DROP BOX SYSTEM
[75] Inventor: Frederick R. Wyss, Newberg, Oreg.
[73] Assignee: Force Northwest Distributors, Inc., McMinnville, Oreg.
[21] Appl. No.: 874,213
[22] Filed: Jun. 13, 1986
[51] Int. Cl.⁴ .............................................. B60P 1/78
[52] U.S. Cl. .................................................. 414/499
[58] Field of Search ............... 414/499, 500, 538, 491, 414/494, 559, 571

[56] References Cited
U.S. PATENT DOCUMENTS

| | | | |
|---|---|---|---|
| 1,288,462 | 12/1918 | Alborn | 414/499 |
| 2,591,153 | 4/1952 | Hodges | 414/499 |
| 2,659,504 | 11/1953 | Kranawetvogel et al. | 414/499 X |
| 3,144,149 | 8/1964 | Dempster et al. | 414/499 X |
| 3,214,046 | 10/1965 | Dempster et al. | 414/499 X |
| 3,272,546 | 9/1966 | Cooley | 414/499 X |
| 3,894,644 | 7/1975 | Alexander | 414/499 X |

Primary Examiner—Peter A. Aschenbrenner
Attorney, Agent, or Firm—Chernoff, Vilhauer McClung & Stenzel

[57] ABSTRACT

The coupling of the present invention is comprised of a carriage which moves along a track mounted in a support frame by means of a motor driven endless chain. The chain is connected to a pivot plate, which is rotatably attached to the carriage. The chain is connected to the side of the pivot plate facing the drop box, which is to be picked up by the device, at a location below the axis which the pivot plate rotates about, and to the other side of the pivot plate above this axis. Thus when the pivot plate strikes a stop, located near the bottom of the support frame, the pivot plate is rotated such that the tip of a U-shaped bail located on its top surface is raised. As a result the frame can then be moved toward the drop box until the bail is above a hook located on its front end. When the chain then is moved in the opposite direction and the carriage pulled free of the stop, the pivot plate rotates back to its original position and the tip of the bail drops over the hook and engages it.

4 Claims, 2 Drawing Sheets

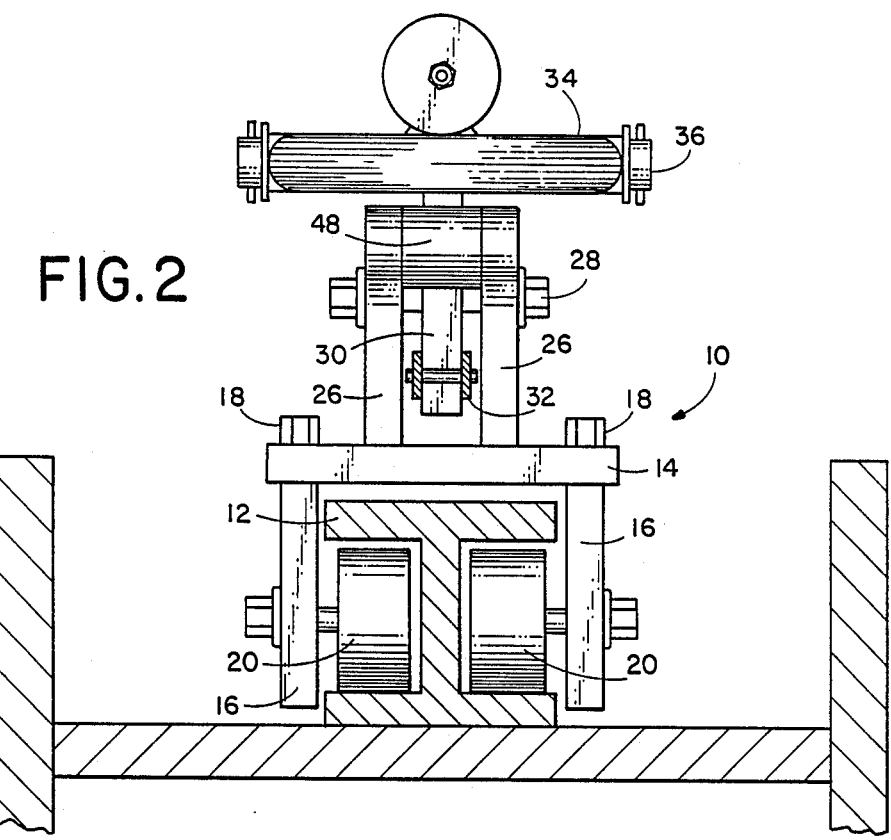
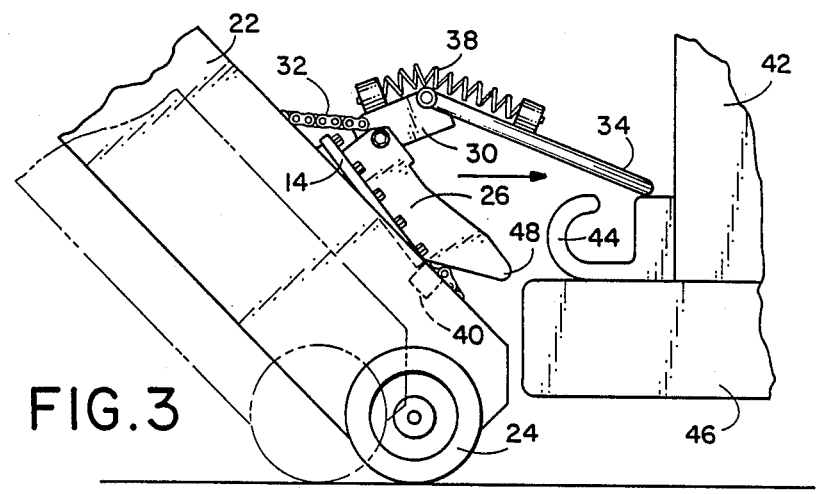

COUPLING FOR DROP BOX SYSTEM

BACKGROUND AND SUMMARY OF THE INVENTION

This invention relates to a coupling for connecting a drop box having a hook located at its front end to the endless chain of a roll off hoist.

There currently are two general systems for loading drop boxes onto a truck for transportation and then unloading them again upon arrival at the intended destination. One of these systems uses a cable having a loop at its end which fits over a hook located at the front of the drop box. The cable is wound onto a winch to pull the drop box up a tilting frame located on the truck. With this system the drop box is unloaded by backing the truck toward the intended drop point and stopping it abruptly. Inertia then causes the drop box to slide off of the truck.

A more recent system improves upon the winch feed system by providing an endless chain in the tilting frame which can be moved in either direction. A carriage, which is connected to the chain, rides on a track located on the frame. The carriage has a hook located on it which is arranged to engage a horizontal bar located on a tongue at the front of the drop box. With this system the carriage can be coupled to the drop box automatically by running the carriage to the bottom of the frame, backing the truck towards the bin so that it is adjacent to the tongue and then moving the carriage back up the track.

Not only can the drop box be coupled to the lifting device automatically with this system, but the chain can be used to positively push the drop box off the truck when it is time to unload it. This allows more precise placement of the drop box and even allows unloading the drop box onto a dock having the same height as the truck.

Because the endless chain system is superior to the cable system, many users of the latter are changing to the former. However, heretofore doing so required conversion of each drop box from one having a hook to one having a horizontal bar which can be engaged by the hook on the chain. Otherwise, it would be necessary to manually interconnect the hook on the chain with the hook on the drop box, with a short piece of cable for example. Conversion is expensive, particularly when a large number of drop boxes are involved and manually coupling is inefficient. What is needed, therefore, is a coupling device on an endless chain type of roll off hoist which automatically will engage the hook of a cable type drop box.

This is accomplished in the present invention by providing a pivot plate which is rotatably mounted on the carriage and which is attached to the chain. The chain is connected to the side of the pivot plate which faces the extremity of the frame at a location below the axis that the pivot plate connects to the carriage and to the other side of the pivot plate at a location above this axis. Mounted on top of the pivot plate is a U-shaped bail which is arranged to engage the hook on the bin. A stop, which is located on the track which the carriage runs on, prevents the carriage from moving past a certain point toward the extremity of the frame. Thus, when the carriage contacts the stop further movement of the chain toward the extremity causes the pivot plate, and thus the bail, to rotate upwardly. When the direction of the motor is reversed, the pivot plate and bail then drop back to their original positions.

In operation, a bin is loaded by tilting the frame from its horizontal traveling position to an angled position where its extremity is proximate the ground. The carriage then is driven up against the stop thereby raising the tip of the bail. When the bail is lifted the truck is backed toward the drop box until the bail is located over the hook and the carriage is moved back up the track. As the carriage pulls away from the stop the bail drops over the hook and engages it. Further movement of the carriage causes the drop box to be pulled up onto the frame and the frame is then rotated to its horizontal position. In unloading the drop box the chain merely is moved towards the extremity of the frame. A pusher plate located on the carriage contacts the drop box and pushes it off of the truck.

Accordingly, it is a principal object of the present invention to provide a coupling for interconnecting a drop box having a loading hook to the carriage of an endless chain roll off hoist.

It is a further object of the present invention to provide such a coupling which engages the hook automatically upon movement of the carriage along the frame which supports it.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 2 is an end elevation view of the coupling of FIG. 1.

FIGS. 3 and 4 are side elevation views, at reduced scale, showing the sequence of operation of the device.

PREFERRED EMBODIMENT OF THE INVENTION

Figure 1:
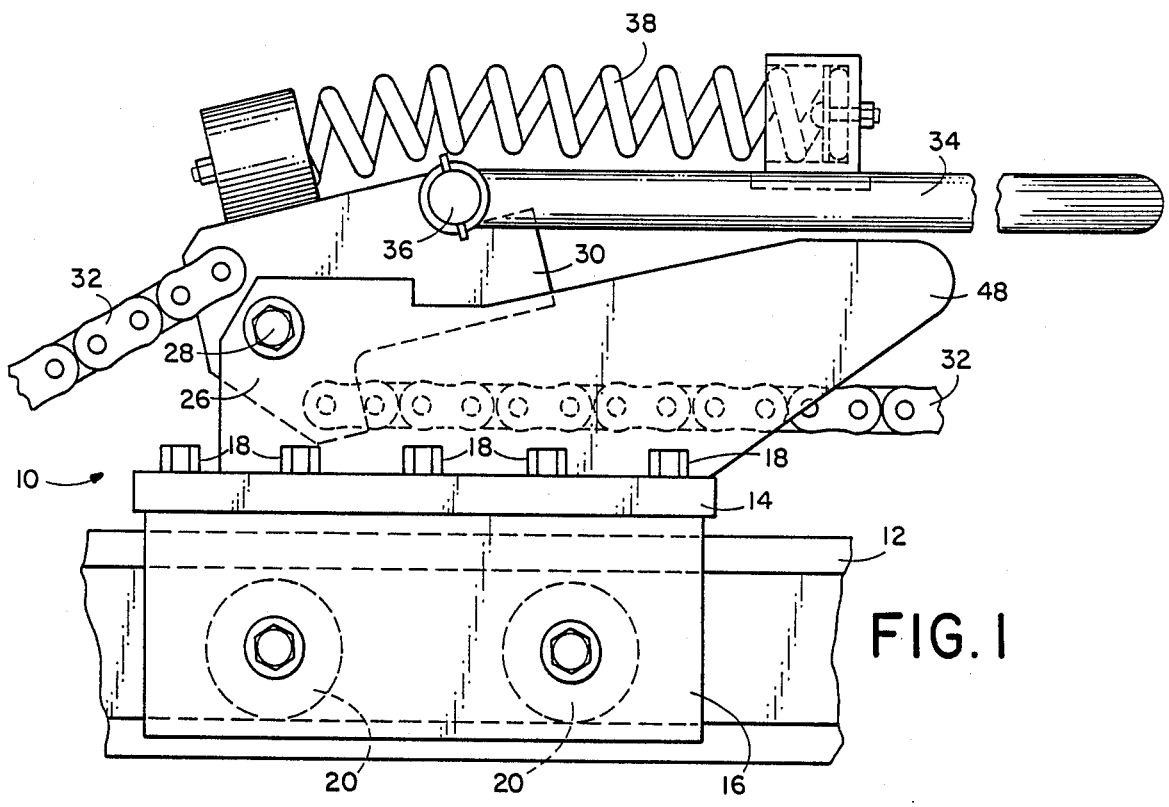
FIG. 1 is a side elevation view of a drop box coupling embodying the features of the present invention.

Referring to FIGS. 1 and 2 of the drawings, the coupling of the present invention comprises a carriage 10 which travels along an I-shaped track 12. The carriage comprises a rectangular top element 14 which is attached to paired spaced-apart side elements 16 by a plurality of bolts 18. Wheels 20, which are rotatably attached to each side element, fit inside the cavities on the sides of the track to secure the carriage to it.

The track is mounted on a frame 22 which is mounted on a truck (not shown) having a tilt mechanism (not shown) which allows the frame to be rotated between the angled loading position shown in the drawings and a horizontal travel position. A wheel 24 located at the extremity of the frame engages the ground when the frame is in its tilted position to facilitate fore and aft movement of the truck.

Mounted on the top element 14 of the carriage, by means such as welding, is a pair of side-by-side supports 26. Rotatably mounted between the supports, by means of a bolt 28, is a pivot plate 30. An endless link chain 32, which travels in a circular path around sprockets (not shown). Each end of the frame is broken and the two ends are attached to the pivot plate. Thus, as the chain is moved, by means of a motor (not shown) which drives the upper sprocket, the carriage travels along the track 10.

Mounted on the pivot plate is a U-shaped bail 34 which extends towards the extremity of the frame which is lowered. The tip of the bail extends past the extremity of the supports 26. A bushing (not shown) which is attached to the top of the pivot plate, receives a bolt 36 which passes through openings in the ends of the bail. Thus the bail rotates freely with respect to the pivot plate. The bail is tied to the pivot plate by means of a spring 38 which permits the bail to move relative to the pivot plate but normally locates it in a particular position relative to the pivot plate.

Located at the lower extremity of the track 12 is a stop 40 which engages the carriage 10 and prevents it from moving past a certain point toward the extremity of the track. The end of the chain 32 which extends toward the lower extremity of the track is attached to the pivot plate at a point which is below the bolt 28, and the other end of the chain is attached to the pivot plate at a point which is above the bolt 28. Thus, if the motor continues to drive the chain toward the lower extremity of the frame after the carriage has engaged the stop 40, the pivot plate rotates to raise the extremity of the bail above its normal position. When the motor then is reversed and the carriage is pulled away from the stop 40, the pivot plate rotates in the opposite direction and the extremity of the bail is dropped to its original position.

Figure 4:
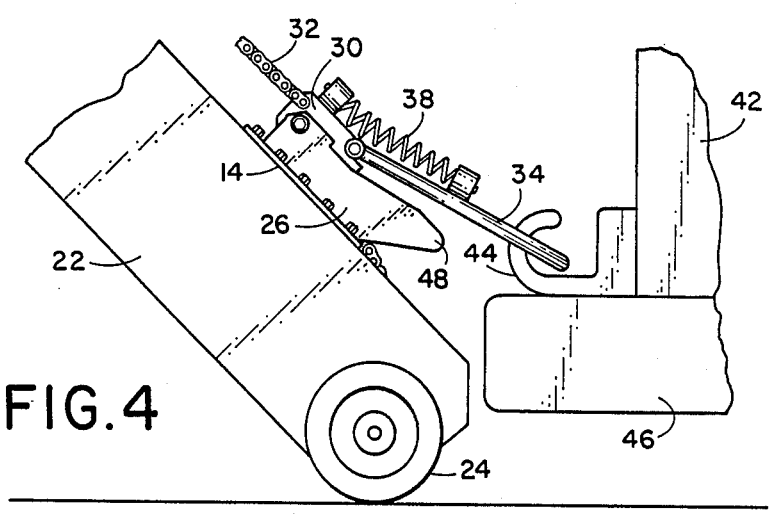

In operation, a drop box 42 is loaded onto the frame 22 by first rotating the frame to the angled position shown in the drawings with a space between the extremity of the frame and the front of the drop box, the phantom line position in FIG. 3. The carriage 10 then is driven down the track 12 until it strikes the stop 40 and the bail 34 is raised. The truck then is backed towards the drop box until the bail is located over the hook 44 located on the front of the skids 46 located at the bottom of the drop box, the solid line position in FIG. 3. The carriage then is moved back up the frame which first causes the bail to be lowered over the hook 44, and then brings the bail into engagement with the hook, FIG. 4. Further movement of the carriage up the frame causes the drop box to be pulled up onto the frame with the skids 46 sliding along the frame. When the drop box is pulled completely onto the frame the frame is rotated back to its horizontal position and the drop box can be transported by the truck.

To unload the drop box the carriage is moved towards the extremity of the frame and the pusher nose 48 located at the front of the supports 26 contacts the front of the drop box and the carriage pushes the drop box back off of the frame 22. Since the drop box is positively pushed off of the frame, rather than relying on inertia, it can be unloaded without the necessity of rotating the frame to an angled position. This allows the drop box to be unloaded onto a raised loading dock which is at the same level as the truck.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A drop box loading system comprising:
   (a) a drop box having a hook at its front end which can be engaged only from above;
   (b) an elongate hoist frame having an upper portion with a track defined therein;
   (c) an endless chain which is rotatably mounted on said frame;
   (d) means for moving said chain in either direction along the elongate axis of said frame;
   (e) a carriage which is attached to said chain;
   (f) said carriage including means for moving it along said track as said chain is moved;
   (g) a bail attached to said carriage, having a tip which extends toward one extremity of said frame;
   (h) a stop, located on said frame, which prevents movement of said carriage past a certain point towards one extremity of said frame; and
   (i) said carriage including lifting means for raising said tip above said hook whenever said chain continues to urge said carriage towards said one extremity of said frame after said carriage has engaged said stop and for lowering said tip into said hook when said carriage is pulled free from said stop, wherein said lifting means comprises:
      (i) a pivot plate which is rotatably attached to said carriage about a first axis;
      (ii) means for attaching the portion of said chain which extends toward one extremity of the frame to said pivot plate at a location above said first axis, and for attaching the portion of said chain which extends in the other direction to said pivot plate at a location below said first axis;
      (iii) wherein said bail is attached to said pivot plate.

2. The loading system of claim 1 wherein said carriage comprises paired, upright supports which are spaced apart by a distance which is slightly greater than the thickness of said pivot plate.

3. The loading system of claim 1 wherein said bail is rotatable relatively to said carriage, including means for positioning said bail approximately parallel with said track, when it is not raised, but permitting it to be moved upwardly or downwardly therefrom.

4. The loading system of claim 3 wherein said means for positioning comprises a spring which extends between said bail and said pivot plate.

* * * * *